United States Patent [19]

Bruer et al.

[11] Patent Number: 4,686,812
[45] Date of Patent: Aug. 18, 1987

[54] ROTATIONAL SPHERE PRESS FOR AGRICULTURAL GRAIN STEM PRODUCTS

[75] Inventors: Dirk Bruer; Karl-Heinz Tooten; Theo Freye, all of Harsewinkel, Fed. Rep. of Germany

[73] Assignee: Claas OHG, Harsewinkel, Fed. Rep. of Germany

[21] Appl. No.: 756,663

[22] Filed: Jul. 19, 1985

[30] Foreign Application Priority Data

Jul. 21, 1984 [DE] Fed. Rep. of Germany ....... 3426965

[51] Int. Cl.$^4$ ............................................. B65B 11/04
[52] U.S. Cl. ........................................ 53/118; 53/587
[58] Field of Search .................... 53/118, 587; 56/341; 198/613

[56] References Cited

U.S. PATENT DOCUMENTS

| | | | |
|---|---|---|---|
| 2,701,634 | 2/1955 | Carroll | 198/613 |
| 3,797,215 | 3/1974 | Kopaska | 56/341 |
| 3,914,926 | 10/1975 | Braunberger | 56/341 |
| 4,132,163 | 1/1979 | White | 56/341 |
| 4,470,247 | 9/1984 | Mast | 56/341 |
| 4,514,969 | 5/1985 | Moosbrucker | 56/341 |
| 4,569,439 | 2/1986 | Freye | 53/118 |

FOREIGN PATENT DOCUMENTS 2634638  2/1978  Fed. Rep. of Germany ........ 53/118

Primary Examiner—John Sipos
Attorney, Agent, or Firm—Pollock, Vande Sande & Priddy

[57] ABSTRACT

In a rotational sphere press for agricultural grain stem products, the wrapping area of which is limited by rotating conveyor rollers, and which has a pre-chamber, a first conveyor mechanism is provided for tranporting the harvested product into the pre-chamber and a second conveyor mechanism is provided for transporting the harvested product from the pre-chamber through a feed hold between two neighboring conveyor rollers into the wrapping area. The second conveyor mechanism has a conveyor drum which is axially parallel to the conveyor rollers and which can be moved perpendicular to an opposite-positioned counterbearing by overcoming the reset force of a reset element within a pre-given motional path. The conveyor drum has driving plate pins which are in the rear area facing the feed hole and neighboring the exteral surface of the drum. They project outwardly, perpendicular to the external surface of the drum in the front and lower area. The driving plate pins are designed for blocking off the harvested product flow into the feed hole.

12 Claims, 3 Drawing Figures

ROTATIONAL SPHERE PRESS FOR AGRICULTURAL GRAIN STEM PRODUCTS

This invention relates to a rotational sphere press for agricultural grain stem products.

SUMMARY OF THE PRIOR ART

Rotational sphere presses are known in the art in various designs and models. The existence of pre-chambers in such rotational sphere presses is supposed to enable continuous operation. When the bales are completed and wrapped in a wrapping material, the feeding of additional product to the winding area must be halted. The harvested product taken in during the wrapping process by the pick-up drum is gathered in a pre-chamber during this operational phase. Once the bales are wrapped, they are deposited and harvested product can once again be conveyed through the feed hole to the wrapping area. For this purpose, the conveyance mechanism must be designed and function in such a manner that it can transport the harvested product stored in the pre-chamber, as well as the new product entering the chamber through the feed holes into the wrapping area.

It is known from DE-OS No. 27 40 299 to provide a horizontal conveyor belt as a conveyance mechanism. The horizontal conveyor belt has not proven to be functional in practice. It is not suitable for conveying the harvested product found in the pre-chamber quickly and assuredly. It is, however, sufficient for conveying the freshly cut, harvested product to the wrapping area. Therefore, this construction has the disadvantage that the pre-chamber is not completely emptied between two evacuations of the wrapping area. The available storage capacity of the pre-chamber, as a result, cannot be used to a maximum so that the continuous operation is not possible despite the existence of a pre-chamber.

An earlier patent application No. (P 33 11 330.0) proposed to form the storage area and the pre-chamber by means of conveyor and press rollers which change their location and whose direction of rotation could be reversed.

Regardless of the fact that a very high degree of technical complexity is required for such a construction for forming a sufficiently large storage area, this construction has the significant disadvantage that it also does not guarantee disruption-free conveyance of the stored, harvested product from the pre-chamber through the feed hole into the wrapping area.

BRIEF DESCRIPTION OF THE INVENTION

Given this technical state of the art, the object of the present invention is to design a turning sphere press of the type described generally above so that it enables disruption-free, uniform, and reliable evacuation of the pre-chamber after the storage process, as well as secure blockage of the wrapping area during the storage phase.

The conveyor drum proposed in the present invention assures uniform and disruption-free evacuation of the pre-chamber after the storage phase. This is caused by the driving plate pins which have no effect on the back side, that is, on the side of the conveyor drum facing the wrapping area, whereas they project across the cylindrical drum and easily drive the harvested product. As a result of the fact that the driving plate pins, which preferably are conveyor prongs, are either immersed into the drum or come into contact with the drum periphery on the back side, the product is completely evacuated to the pressing area. By limiting the adjustment possibility of the conveyor drum, it is assured that a steady flow of harvested product is conveyed through the feed hole into the wrapping area without the danger of congestion. The product in the storage area is steadily evacuated. The existence of a reset element, preferably in the form of a spring, assures the necessary product pressure onto the conveyor drum or to the counter-bearing on the other side. This counter-bearing can be either a stationary piece of metal or a rotating element; for example, a drum.

BRIEF DESCRIPTION OF THE DRAWINGS

Preferred embodiments of the invention are described in detail below with the aid of diagrams, in which.

DESCRIPTION OF THE PREFERRED EMBODIMENT

The rotational sphere press with two turning wheels, 22, on the side has a stationary housing area, 7, in the front and a housing area, 8, in the rear which can be folded up and that can be turned in the direction of the double arrow, 9. In order to eject the bales, 23, the rear housing area, 8, can be folded upward.

The wrapping area, 1, is limited by conveyor rollers, 10, which rotate next to each other and are axially parallel to each other. The conveyor rollers, 10, create a feed hole, 5, through which the harvested product, 2, arrives into the wrapping area, 1.

Figure 1:
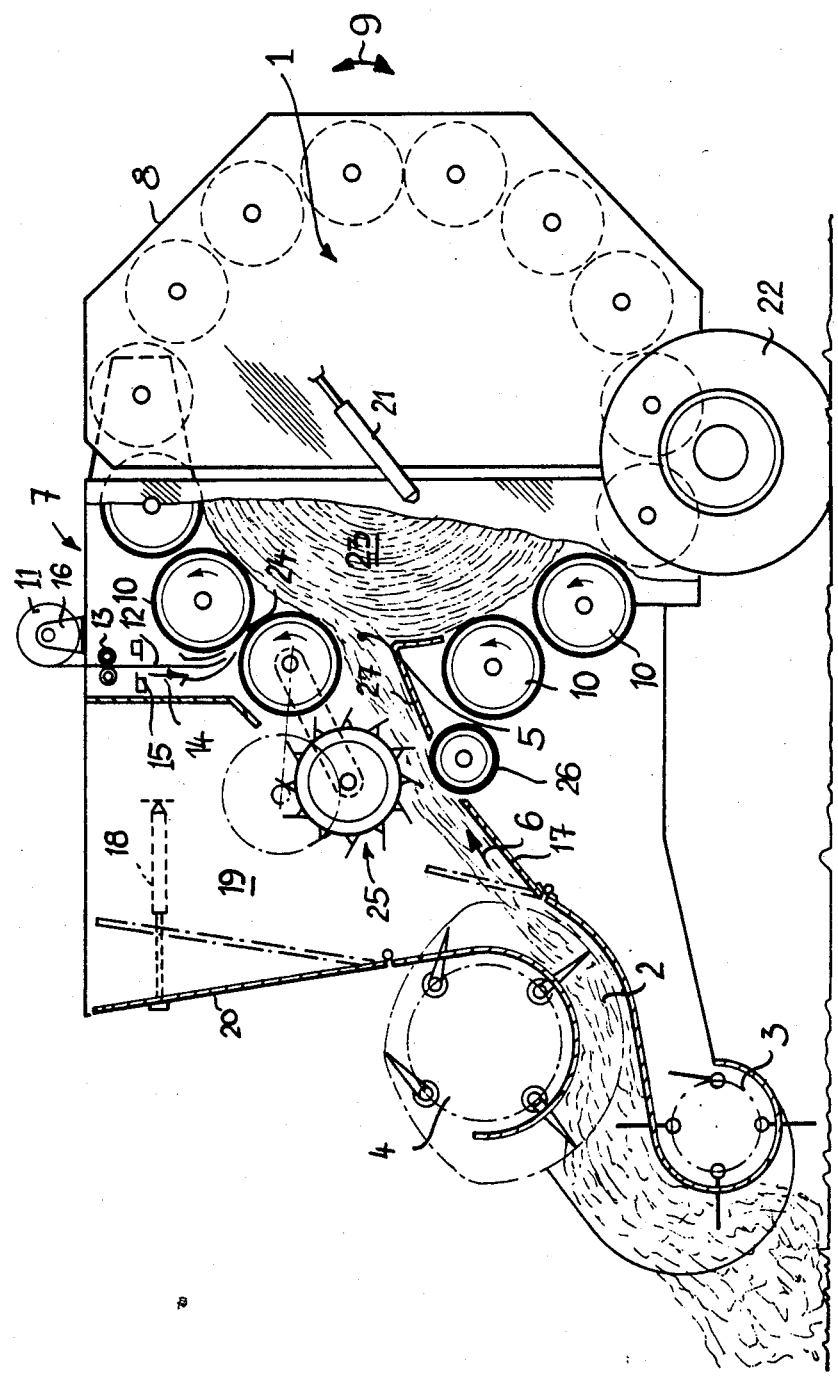
FIG. 1 shows a partial schematic cross-section from the side of a first embodiment of the turning sphere press.

The harvested product, 2, is picked up from the soil by the pick-up drum, 3, and is transported into the intake area of the conveyor drum, 4. It is conveyed through the feed hole, 5, into the wrapping area, 1, in the direction of the arrow, 6, by means of the conveyor drum, 25. In the embodiment of FIG. 1, the metal piece, 27, is provided in a folding area, 17. A smooth counter-roller is attached in front of the metal piece 27 opposite the conveyor drum, 25. In this embodiment only, the area, 27, located behind the counter-roller, 26, is provided with a stationary metal piece. On the other hand, there are no counter-rollers, 26, in the embodiments shown in FIGS. 2 and 3. That is, the metal piece stretches either to the lower end of the pre-chamber, 19, or to the folding area, 17.

The pre-chamber, 19, is open at the top. The front wall, 20, of the pre-chamber can be turned either frontward or backward around a horizontal axis with the aid of an adjustment element, 18.

An intake point, 24, is located above the feed hole, 5. Wrapping material, 12, enters the intake point, 24, into the wrapping area, 1, when the bales are completely rolled. The wrapping material, 12, is located on the storage drum, 11, which is borne in a way that it can be turned above the turning sphere press.

The wrapping material, 12, turns in the direction of the arrow, 14, across a cogged tooth gear, 13, and through a separating mechanism, 15, as well as through the intake point, 24, on the periphery of the almost completely rolled bales. As soon as the front end of the wrapping material has reached the feed hole, 5, the harvested product is no longer fed in until the end of the wrapping material overlaps the end of the wrapping material in the area of the intake opening, 24, with the end of the wrapping material separated by the separating mechanism, 15. Once this occurs, the completely rolled and wrapped bales can be ejected as soon as the rear housing area, 8, has been folded upward with the aid of the activating cylinder, 21.

Figure 2:
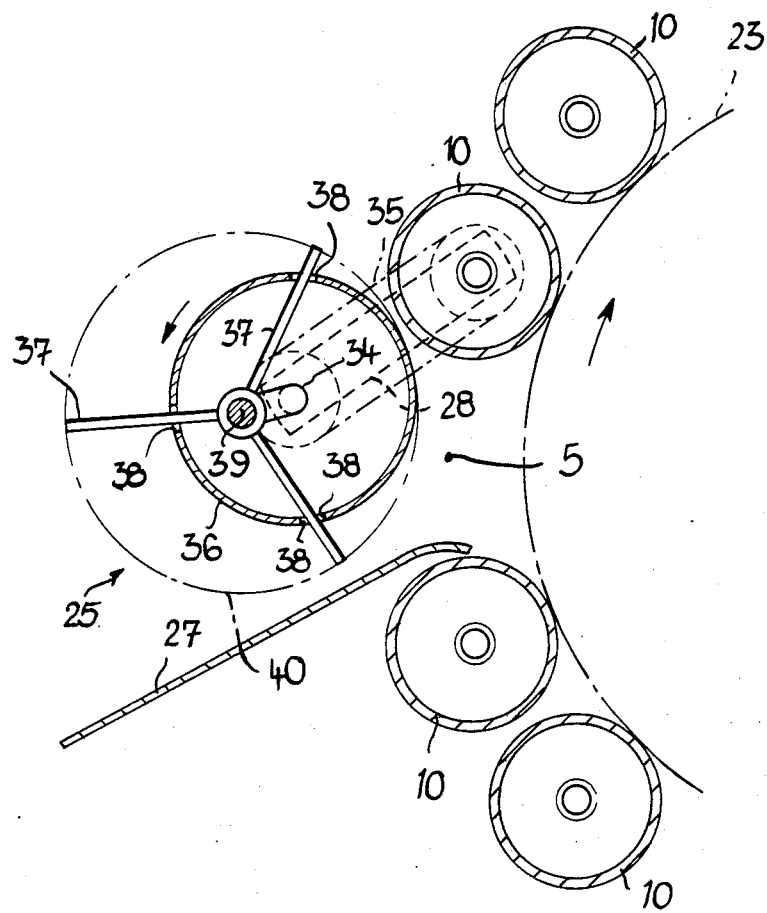
FIG. 2 shows a schematic cross-section of the intake area of a second design.
Figure 3:
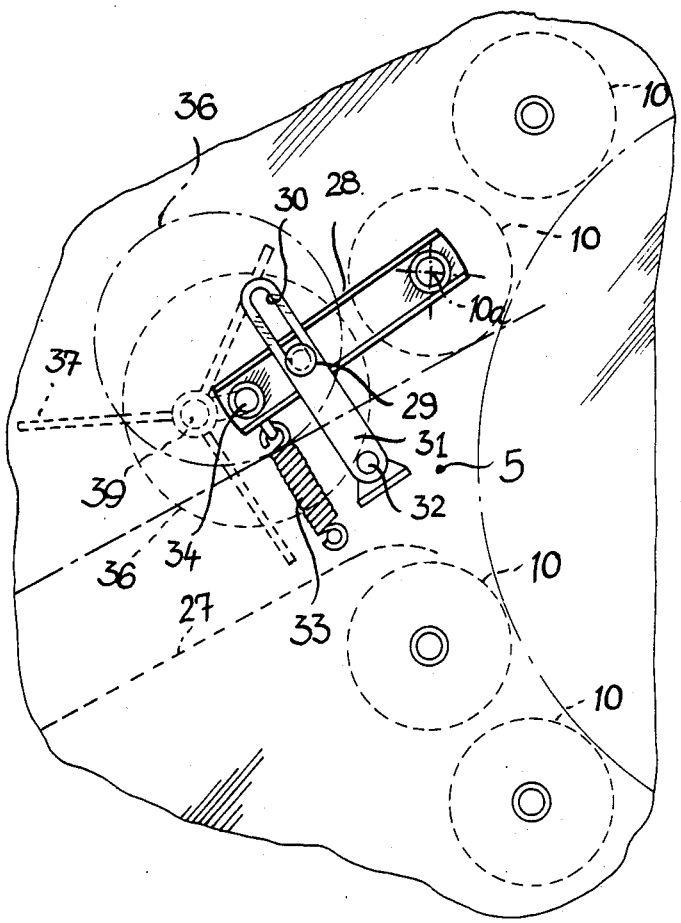
FIG. 3 shows a side view of the intake area depicted in diagram 2 of the second design.

In the embodiments shown in FIGS. 2 and 3, elements of the conveyor drum, 25, and its drive are illustrated. The conveyor drum, 25, has a cylindrical drum, 36, with perforations on the periphery, 38. Conveyor prongs, 37, point outward through the peripheral perforations, 38. The interior area of the conveyor prongs, 37, are borne on a stationary pivot axis which enables unhindered turning of the conveyor prongs, 37.

The bearing point, 34, of the drum, 36, is to the side of the turning axis, 39. The bearing point, 34, carries a drive wheel connected to the drum, 36, which is turned by means of a drive chain, 35, together with the drum, 36. The drive chain, 35, is driven by the neighboring conveyor roller, 10.

The swing arm, 28, is pivot-mounted around the turning axis, 10a, of the conveyor rollers, 10. It bears a spigot, 29, which is guided into a longitudinal hole, 30. The ends of the longitudinal hole, 30, the swing arm, 28, and limit its movements. The longitudinal hole, 30, is located in a holder, 31, which turns around a swing axis, 32. A draw spring, 33, which draws the conveyor drum, 25, in the direction of the metal piece, 27, is attached to the swing arm, 28.

In FIG. 3, the two possible end positions of the drum, 35, are depicted with dashes and with dashes and dots. The clearance between the metal piece, 27, and the opposite profile of the drum, 36, at its most extended state is smaller than the width of the feed hole, 5.

When the drum, 36, which is driven by the drive chain, turns, the conveyor prongs, 37, turn around the turning axis and define the turning circle, 40, with their ends. The conveyor prongs, 37, are driven by the drum, 36, which drives the conveyor prongs, 37, in the rotational direction at the peripheral perforations, 38.

The pre-chamber is blocked off in such a way that the drum, 36, is held in the position shown in FIGS. 2 and 3. For this, the conveyor prongs, 37, located next to each other and pointing in the direction of the metal piece, 27, serve as blockage gates.

Having thus described our invention, what we claim as new and desire to secure by Letters Patent is:

1. A press for harvested agricultural grain stem products comprising:
   (a) a wrapping zone
   (b) a prechamber located upstream to said wrapping zone;
   (c) a plurality of conveyor rollers located at the periphery of said wrapping zone;
   (d) a feed entryway formed between two of said conveyor rollers for communication between said prechamber and said wrapping zone;
   (e) a first conveyor means for conveying the harvested product into said prechamber from outside the press;
   (f) a second conveyor means for transporting said harvested product from said prechamber through said feed entryway into said wrapping zone, said second conveyor means comprising a conveyor drum having a plurality of prongs, and a movable reset member for providing at least at times pressing force between said harvested product and said conveyor drum, means for intermittently rotating said drum to feed said product and for stopping said drum to blockoff the entry of said product into said wrapping zone while a previous product is being wrapped; wherein said drum is axially parallel to said conveyor rollers, said press further comprising a counter-bearing member located opposite said conveyor drum relative to the path of the product, wherein said drum can be shifted by overcoming said pressing force of said reset element perpendicular to said counter-bearing within a given path of motion.

2. A press according to claim 1 wherein said counter-bearing consists of a metal piece wedging into said feed entryway.

3. A press according to claim 1 or 2 wherein said second conveyor member further comprises driving plate pins being formed by said conveyor prongs which are located in series parallel to said drum axis.

4. A press according to claim 1 or 2 wherein, upon stoppage of said conveyor drum, said conveyor feed entryway is blocked off in a gate-like manner by said plurality of conveyor prongs.

5. A press according to claim 3 wherein, upon stoppage of said conveyor drum, said conveyor feed entryway is blocked off in a gate-like manner by said plurality of conveyor prongs.

6. A press according to claim 3 wherein said driving plate pins are distributed on the drum periphery in a cyclical manner.

7. A press according to claim 6 wherein said conveyor prongs extend through peripheral perforations from the interior of said cylindrical drum and with its interior area being maintained at a portion located outside the turning axis of said drum in such a way that they move inwardly and outwardly in their perforations when said cylindrical drum rotates.

8. A press according to claim 7 wherein said conveyor prongs have their interior area held on a turning axis off center from the turning axis of said drum and are not rotating synchronously.

9. A press according to claims 1 or 2 wherein said conveyor prongs are pivotally mounted around axes parallel to the turning axis of said drum and with its rear area being in contact with the external surface of the drum and front and lower area being turned away from it.

10. A press according to claim 3 wherein said conveyor prongs are pivotally mounted around axes parallel to the turning axis of said drum and with its rear area being in contact with the external surface of the drum and front and lower area being turned away from it.

11. A press according to claim 1 or 2 wherein a shift area of said conveyor drum is at least equal to the width of said feed entryway.

12. A press according to claim 10 wherein a shift area of said conveyor drum is at least equal to the width of said feed entryway.

* * * * *